(12) United States Patent
Workman et al.

(10) Patent No.: US 7,617,921 B2
(45) Date of Patent: Nov. 17, 2009

(54) CAN MANIPULATING SYSTEM

(76) Inventors: Harry W. Workman, 658 E. 900 North, Westville, IN (US) 46391; Dale G. Chapman, Sr., 739 Willowfield Ct., New Lenox, IL (US) 60451; Evan D. Roberts, P.O. Box 369, Peotone, IL (US) 60468

( * ) Notice: Subject to any disclaimer, the term of this patent is extended or adjusted under 35 U.S.C. 154(b) by 386 days.

(21) Appl. No.: 11/709,093

(22) Filed: Feb. 22, 2007

(65) Prior Publication Data

US 2008/0203109 A1    Aug. 28, 2008

(51) Int. Cl.
*B65G 47/24* (2006.01)
(52) U.S. Cl. .............. 193/46; 193/29; 193/44; 198/417
(58) Field of Classification Search ............ 193/12, 193/29, 44, 46; 198/406, 417
See application file for complete search history.

(56) References Cited

U.S. PATENT DOCUMENTS

| | | | | |
|---|---|---|---|---|
| 1,193,624 A * | 8/1916 | Small | ............ | 193/46 |
| 2,097,368 A * | 10/1937 | Frank | ............ | 193/31 R |
| 2,529,603 A * | 11/1950 | Galt | ............ | 198/399 |
| 2,800,211 A * | 7/1957 | Madden | ............ | 193/46 |
| 3,331,486 A * | 7/1967 | Towry | ............ | 198/380 |
| 3,797,624 A * | 3/1974 | Powell et al. | ............ | 193/25 R |
| 3,902,682 A * | 9/1975 | Woll | ............ | 406/182 |
| 4,458,801 A * | 7/1984 | Nichols | ............ | 193/46 |
| 4,991,705 A * | 2/1991 | Francioni | ............ | 193/44 |
| 5,609,237 A * | 3/1997 | Lenhart | ............ | 198/406 |
| 6,499,582 B1 * | 12/2002 | Gillott | ............ | 198/360 |
| 6,662,832 B2 * | 12/2003 | Baker | ............ | 141/234 |
| 6,944,944 B1 * | 9/2005 | Craythorn et al. | ............ | 29/798 |

* cited by examiner

*Primary Examiner*—Douglas A Hess
(74) *Attorney, Agent, or Firm*—Evan D. Roberts

(57) ABSTRACT

This invention structurally includes an adjustable guide rail system for laterally adjustably guiding and axially rotatably manipulating containers, such as cans, passed axially between the guide rail systems and with structure to simply and easily facilitate adjustment of the system to adjust to various series of different size cans to guide multiple series of different size cans there through by rotating a cylinder through which the cans passed to present a different passage for each respective series of different size cans.

3 Claims, 2 Drawing Sheets

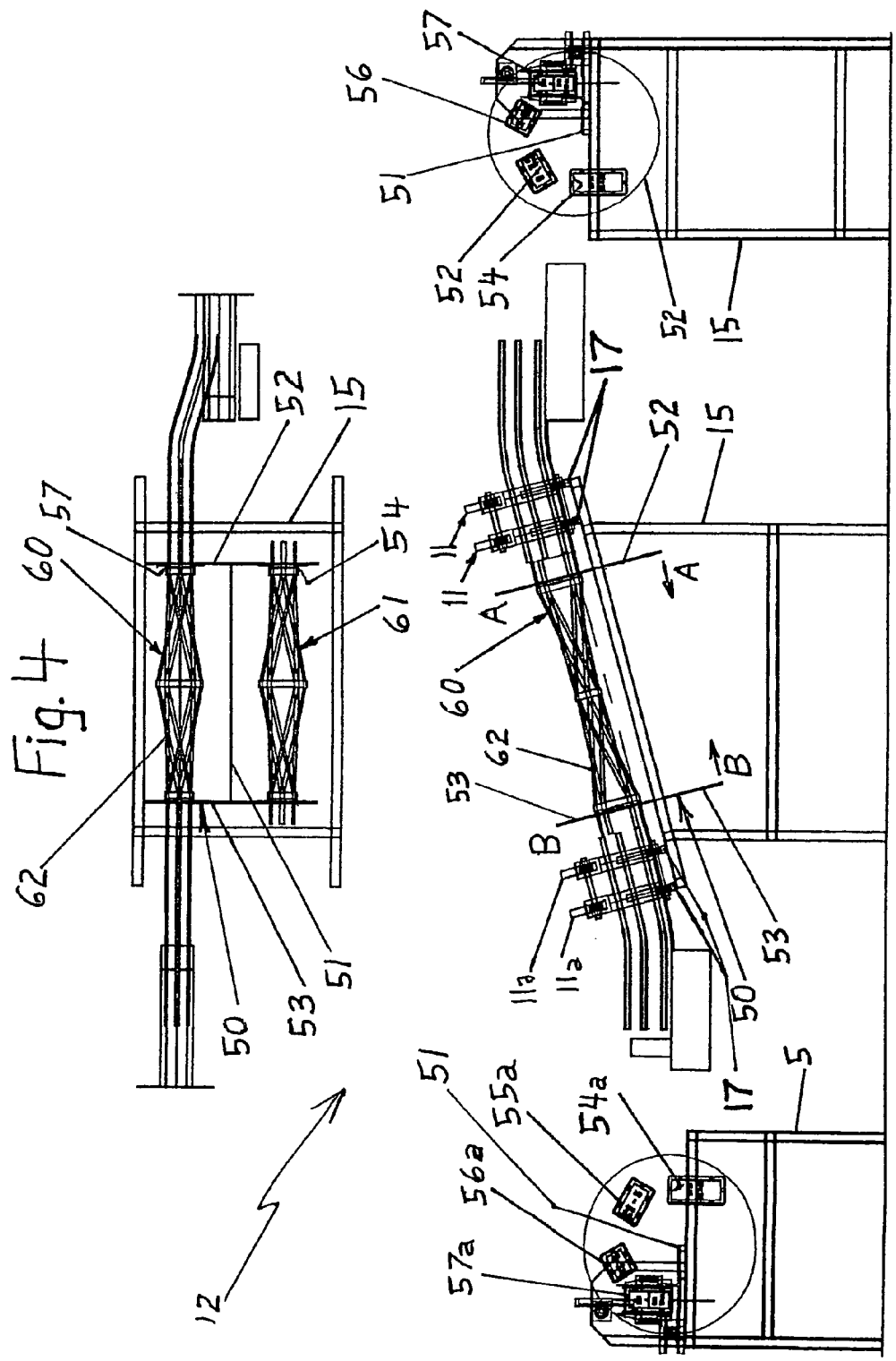

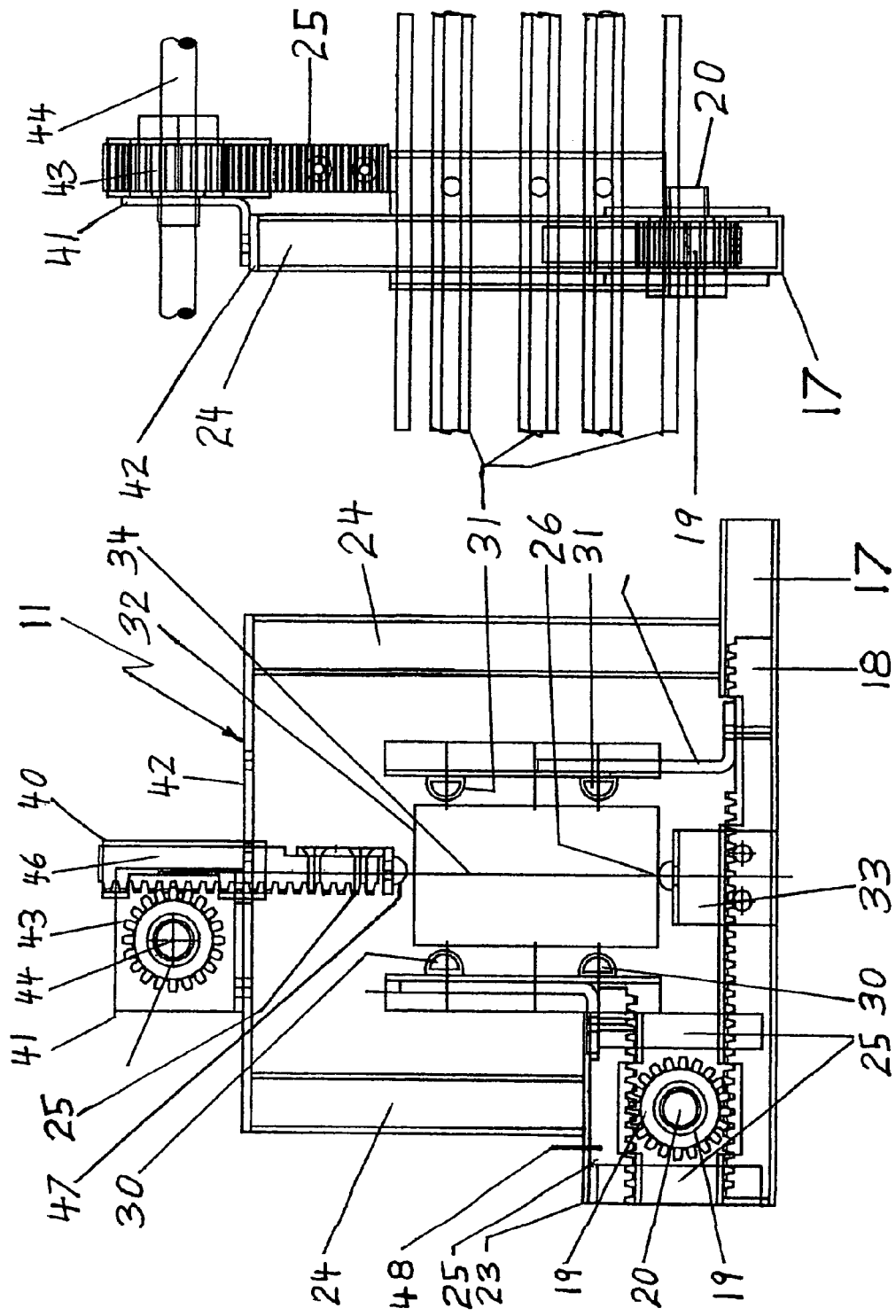

CAN MANIPULATING SYSTEM

BACKGROUND OF THE INVENTION

In the processing of containers such as cans and the like, it is usually necessary to rinse the cans. If a rinse is poured or otherwise invasively introduced into the cans, it becomes necessary to evacuate such fluid from such containers prior to ultimate use of the containers.

SUMMARY OF THE INVENTION

Presently it is typical to employ several distinct processes to respectively invasively introduce rinsing fluid into containers such as cans and then evacuate such fluid as the cans pass along in a process production line.

Currently, can rinsing systems, known to the inventor, for the rinsing of aluminum cans prior to the cans being filled with a beverage, or like product, tends to require a separate apparatus or system for every different size or shape of can. In some instances of known systems, however, in which adjustments can be made to accommodate the handling a different size can, require complicated skilled labor and extensive separate special tools and expensive complicated equipment. This all requires an extensive inventory of tools and equipment in addition to experienced and skilled millwrights for preparation, operation and maintenance to have the system attempt to accommodate different sized cans.

Accordingly, it is an object of this invention to manipulate to invert cans as the cans are moved along a production line so that rinsing fluid can be imposed into the cans and evacuated therefrom.

It is a further object of this invention to provide a can manipulator that can be readily adjusted to support and guide various size cans as they are moved and manipulated in a production line.

Also, it is a further object of this invention to provide a can manipulator that can be accurately adjusted by unskilled labor according to the size and shape of the container being processed.

Additionally, it is an object of this invention to provide a can manipulating system that can be accurately adjusted without requiring separate or specialized tools.

Further, it is a further object of this invention to provide a can manipulating system that has an adjustment calibrated to the size of the container to be processed, for ease of adjustment and provision of proper support for cans to be processed therethrough without requiring skilled labor or expensive separate tools and equipment.

Additionally, it is an object of this invention to provide a can manipulating system that will facilitate the flow of fluids out of containers being processed without that fluid flowing into, and contaminating, the system hereof Still further, it is an object of this invention to provide a can manipulating system that can be employed in tandem in a container processing production line to compound the facility thereof.

Other advantages and other novel aspects of the invention will become apparent upon consideration of the following detailed description thereof in conjunction with the accompanying drawings wherein:

FIG. 1 is a side vertical view of the can manipulating system hereof showing the overall interrelationship of the structural assemblies of this invention;

FIG. 2 is a view taken along line A-A of FIG. 1 illustrating an example setup for passing cans from a production line into a size selecting manipulating portion of this invention;

FIG. 3 is a left view taken along B-B of FIG. 3 illustrating an example setup for passing manipulated cans back into a production line;

FIG. 4 is a schematic top view of the cans of this invention through an offset cylinder-like manipulating assembly illustrating the rotational positioning of the cylinder to select a size appropriate can rotating conduit, among available conduits, for a certain size of cans;

FIG. 5 is a partial view taken laterally through the can production line path of cans to be manipulated by this invention showing the adjustable guide assemblies in pinion and rack adjusted configuration for two-dimensionally supporting and directing of the entrance and exit of cans to and through this invention; and FIG. 6 is a partial illustrative side view of the entrance and exit adjustable guide assemblies showing the guide rails in the pinion and rack adjustment relationship for two-dimensional supporting and directing the entrance and exit of cans to and through this invention.

Referring to the figures, there is illustrated a multi-size adjustable can or other similar container manipulating system, generally designated by the numeral 10. System 10 generally includes, among other things, an adjustable can guiding fee assembly designated by numeral 11, and a can manipulating assembly generally designated by the numeral 12.

Adjustable can feed assemblies 11 and 11a (FIGS. 1, 5 and 6) are supported on frame 15 and has a laterally positioned lower horizontal rack tube 17 secured to frame 15 with a lower rack 18 slidably housed therein. Lower rack 18 is adapted to actively engage pinion 19 fixed to adjustment shaft 20. Shaft 20 is rotatably secured to shaft mount 21. An adjacent upper rack tube 23 is secured to frame 24. An upper rack 25 is slidably housed in upper rack tube 26.

Upper rack 25 (FIG. 5) is also adapted to actively engage pinion 19 whereby when shaft 20 is rotated, pinion 19 will rotate to cause racks 18 and 25 to move in opposite direction from each other, depending on direction of rotation of adjustment shaft 20. A bottom guide rail 26 is mounted on lower rack gear 18 by support bracket 33 to move with rack gear 18 to support passing cans on a centerline 34.

A system of left side guide rails 30 from part of a rail support system adapted to support the left side of passing cans 32 is secured to left guide rail mount 33 which is secured to upper horizontal adjustment rack gear 25 to move with rack gear 25 toward and away from centerline 34 to adjust the support of left side of passing cans.

A system of side guide rails 31 opposing guide rail system 30 form a part of a rail support system adapted to support the right side (FIG. 5) of passing cans 32. Guide rails 31 are secured to a right can guide rail mount 33 which, in turn, is secured to lower horizontal adjustment rack 18 to move with rack 18 toward and away from a centerline 34 to complementally support right side of passing cans 32. Lower rack 18 is adapted to operably engage pinion 43 and move horizontally in upper rack tube 23 when shaft 44 is rotated.

Lower guide rail rack 18 is adapted to adjustably support the right side (FIG. 5) of cans 32 of right system of side guide rails 31. Left guide rail mount 37 is secured to lower horizontal adjustment rack gear 18 to move laterally with lower rack 18 whereby when lower horizontal adjustment shaft 20 is rotated clockwise, upper horizontal adjustment rack 23 will move to the right toward passing cans 32 and centerline 34 and upper horizontal diameter adjustment rack gear 25 will move to the left toward passing cans 32 and centerline 34 to provide symmetrical support for passing cans 32, depending on the extent of rotation of pinion gear 19.

A vertical height adjustment rack gear guide tube 40 is secured to top support 42 of frame 15. A pinion gear 43 is rotatably mounted on shaft 44 secured to top support plate 41. Height adjustment rack gear 46 is slidably mounted in rack guide tube 40 in operable engagement with pinion 43. When shaft 44 is rotated, pinion 43 will drive rack 46 vertically up or down, depending on rotation of shaft 44 to adjust vertical height adjustment rack 46 with top bar rail support 47 adjacent to top of passing cans 32 to provide top support for passing cans 32.

Thus, by rotating pinions 19 and 43, support rail systems 30 and 31 and top support rail 47 will be symmetrically and uniformly adjusted to provide support and alignment of passing cans in two directions to automatically adjustably position cans 32 on centerline 34 as cans 32 pass therefrom. As noted (FIG. 1), adjustable can feed assemblies 11 and 11a can be utilized in respective tandem arrangement to provide structural guide stability for guide rails 30, 31 and 26 for feeding cans therethrough.

A locking pin 48 (FIG. 5) is insertable in any of a series of openings through frame 23 and into rack gear 25 to lock adjusting feed assemblies 11 and 11a into selected can supporting positions without requiring special tools or skilled labor. Each such locking pin hole is positionable along rack gear 25 to calibrate a selected support and guidance for a certain two-dimensional size of cans 32.

Second adjustable can feed assembly 11a (FIG. 1) is identical with first adjustable can feed assemblies 11 and 11a and, accordingly, the description and function thereof are identical and not repeated except by indication.

Can manipulating assembly 12 (FIG. 5) is mounted on frame 15 and consists of a cylinder-like structure assembly 50 rotatably mounted on frame 15 at axis 51 (FIGS. 2 and 3). Cylinder 50 and axis 15 are parallel to and laterally offset from axial centerline 34 of adjustable can feed assemblies 11 and 11a.

Cylinder 50 has an entry plate 52 perpendicular to cylinder axis 51 and an exit plate 53 which are rotatable with cylinder 50 and axis 51. Plates 52 and 53 have opposed respectively identical given sized rectangular conduit openings 54, 55, and 56 and axially aligned with rectangular openings 57, 54a, 56a and 57a of exit plate 53 and corresponding to respective size of a certain series size of cans 32 to be passed threrethrough. Parallel complementary rectangular cross section conduits such as 60 and 61 (FIG. 4) are secured to and between respective plates 52 and 53 at respective plate openings, such as 54 and 57 (FIG. 2) to receive cans 32 passing from adjustable conduit can guide 11 to conduit can guide 11a.

Illustrated conduits such as 60 and 61 are spirally constructed so as to laterally rotate the selected series of juxtapositioned cans 32 as the cans are passed through conduits such as 60 and 61 and are constructed to maintain the general relative juxtaposition of the series of cans 32 being passed and rotated therethrough from entry plate 52 to exit plate 53, whereby cans 32 of juxtapositioned series of cans will be manipulated from vertical upright orientation to inverted orientation, and back to vertical, as same pass through can manipulating assembly 12.

The illustrated construction of conduits 60 and 61 (FIGS. 1 and 4) is a spaced part longitudinal rail system of parallel rails 62 as extensions of rails 30 and 31 (FIGS. 5 and 6) of adjustment can feed assemblies 11 and 11a. Rails 62, while providing lateral guiding and support for cans 32, are spaced apart to allow rinsing fluid, or the like, to be injected through the rail spacing into cans 32 as cans 32 are passed therethrough. Rinsing fluid can thereafter be readily evacuated by gravity, or other means, when cans 32 are manipulated to the inverted orientation by can manipulating assembly 12.

In summary, the can manipulating system of this invention has the facility to effect adjustment to different sized containers, both in height and diameter without requiring special separate tools because all adjustments are made by the system itself Accordingly, the change over time from handling one size can to another is extremely fast and efficient.

It is to be understood that the invention is not to be limited to the specific construction and arrangements shown and described, as it will be understood to those skilled in the art that certain changes may be made without departing from the principles of the invention.

What is claimed:

1. A can manipulating system for orienting a series of certain sized juxtapositioned cans moving on a longitudinal axis through the system in a can processing production line comprising an adjustable can feed assembly adapted to position and support a juxtapositioned series of cans received from a production line feeding a can manipulating system, a can manipulator adapted to receive cans from said adjustable can feed assembly, said can manipulating means comprising a cylinder having a disc plate at each end, a series of conduits secured between said disc plates for passing cans therethrough between said discs, said conduits adapted to pass a respectively selected series of cans therethrough in a side by side orientated juxtaposition, and said adjustable can feed assembly comprises a frame for supporting said adjacent can feed assembly, a first horizontal rack gear tube secured to said frame extending laterally to the path of cans to be manipulated, a first rack gear slidably mounted in said first rack tube with gear teeth adapted to operably engage a pinion gear, a second stationary horizontal rack gear tube secured to said frame parallel to said first rack tube to accept a pinion gear therebetween, a second rack gear slidably mounted in said second rack tube and having gear teeth opposing gear teeth of said first rack gear teeth and operably oriented to accept a pinion with said first rack gear, a pinion shaft rotatably mounted on said frame between said rack gear tubes, a pinion secured to said pinion shaft to rotate with said pinion shaft, said pinion having gear teeth in operable engagement with said rack gear teeth of said first and second rack gear teeth to move said first and second rack gears' teeth in opposite directions when said shaft is rotated, right guide rails secured to lower rack gear for guiding and supporting right side of passing cans, an upper vertical rack gear tube extending vertically downwardly toward the path of cans to be manipulated, a vertical rack gear slidably mounted in said vertical rack tube with gear teeth adapted to operably engage a pinion gear, a top pinion shaft rotatably mounted on said frame adjacent said vertical rack, a top pinion gear secured to said top pinion shaft to rotate with said top pinion shaft, said pinion having gear teeth in operable engagement with said vertical rack teeth to move said vertical gear rack vertically up or down when said vertical shaft is rotated, a bottom guide rail secured to said lower rack gear to move laterally with said lower rack gear for adjustably supporting cans passing over said bottom guide rail whereby when cans are moved through said can manipulator from between said adjustable can feed assembly and the containers will be supported on four sides as the containers pass along and within the guide rail systems.

2. A can manipulating system as set forth in claim 1 wherein said adjustable can feed assembly comprises a left longitudinal guide rail system for laterally supporting a left side of containers moving adjacent thereto, a right longitudinal guide rail system opposite said left guide rail system for laterally supporting a right side of containers moving adjacent thereto and between said left and right guide rail systems, means for moving said left and right rail systems relative to each other to laterally adjustably support containers therebetween, a bottom guide rail system for supporting the bottom of containers moving adjacent thereto, a top guide rail system opposite said bottom rail for supporting the top of containers moving adjacent thereto and between said bottom and top guide rail systems, adjusting means for positioning said top guide rail system toward and away from said bottom guide rail system to adjustably support containers moving therebetween, said manipulating assembly comprises a cylinder adapted to receive cans from said adjustable can feed assembly, and a cylinder having a disc plate at each end, a series of conduits secured between said discs for passing cans therethrough between said discs, said conduits adapted to pass a series of cans therethrough in a side by side juxtaposition, whereby when containers are moved between said left and right guide rail systems and said top and bottom guide rail systems, the containers will be supported on four sides as the containers pass along and within said guide rail systems.

3. A can manipulating system as set forth by claim 2 wherein said manipulating assembly comprises a cylinder means mounted on the axis thereof for receiving cans from a first adjustable can feed assembly, the axis of said cylinder being parallel to and offset from the path of cans received from said adjustable guide system, said cylinder having an entry plate perpendicular to the axis of said cylinder and positioned adjacent said first adjustable guide assembly adapted to receive cans from said adjustable guide assembly, said cylinder having an exit plate perpendicular to the axis of said cylinder, said entry and exit plates having opposed identical certain sized aligned conduit openings corresponding to respective size of cans passed thereto from said adjacent guide system, said cylinder having parallel conduits respectively interconnecting corresponding respective plate openings, a second adjustable guide assembly for receiving the series of passing cans from exit plate conduit opening providing adjustable lateral complementary guiding alignment and positioning support of the corresponding cans passing from said cylindrical can manipulating assembly, said cylinder being adjustably rotatable on said axis thereof to selectively respectively align said cylinder plate receiving openings to respectively like-sized cans passed thereto by said adjacent guide system, a conduit system interconnecting said cylinder discs having tubular conduits adapted to maintain the orientation of the cans and adapted to receive and pass a selected respective series of like-size cans therethrough from said first adjustable two-dimensional guide system, said conduit system tubes having a spiral configuration adapted to laterally rotate the axial orientation of the series of cans passing therethrough to manipulate a selected series of cans passing therethrough, whereby when cans are laterally rotatably passed through a selected cylinder can manipulating conduit, the axial orientation of the cans will be rotated.

* * * * *